United States Patent
Lee et al.

(10) Patent No.: US 10,913,989 B2
(45) Date of Patent: Feb. 9, 2021

(54) METHOD FOR LEACHING PRECIOUS METALS CONTAINED IN WASTE DENITRIFICATION CATALYST USING PRESSURE LEACHING PROCESS

(71) Applicant: KOREA INSTITUTE OF GEOSCIENCE AND MINERAL RESOURCES, Daejeon (KR)

(72) Inventors: Jin-Young Lee, Daejeon (KR); Hoo-In Lee, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 398 days.

(21) Appl. No.: 15/123,624

(22) PCT Filed: Feb. 27, 2015

(86) PCT No.: PCT/KR2015/001944
§ 371 (c)(1),
(2) Date: Sep. 2, 2016

(87) PCT Pub. No.: WO2015/133769
PCT Pub. Date: Sep. 11, 2015

(65) Prior Publication Data
US 2017/0073795 A1    Mar. 16, 2017

(30) Foreign Application Priority Data
Mar. 5, 2014    (KR) .................. 10-2014-0026130

(51) Int. Cl.
*C22B 34/36* (2006.01)
*C22B 7/00* (2006.01)
*C22B 34/22* (2006.01)

(52) U.S. Cl.
CPC ............ *C22B 34/365* (2013.01); *C22B 7/008* (2013.01); *C22B 7/009* (2013.01); *C22B 34/225* (2013.01); *Y02P 10/20* (2015.11)

(58) Field of Classification Search
CPC ....... C22B 34/365; C22B 7/008; C22B 7/009; C22B 34/225; Y02P 10/214; Y02P 10/23; Y02P 10/234
See application file for complete search history.

(56) References Cited

U.S. PATENT DOCUMENTS

| | | | |
|---|---|---|---|
| 4,666,685 A * | 5/1987 | Wiewiorowski | C01G 31/00 423/127 |
| 2002/0112569 A1* | 8/2002 | Farone | C22B 3/10 75/741 |
| 2004/0089841 A1* | 5/2004 | Green | B09C 1/02 252/182.32 |

FOREIGN PATENT DOCUMENTS

| | | |
|---|---|---|
| KR | 2002-0040736 | 5/2002 |
| KR | 2003-0083558 | 10/2003 |

(Continued)

OTHER PUBLICATIONS

Machine Translation of KR-20030083558-A (Year: 2003).*

(Continued)

*Primary Examiner* — Paul A Wartalowicz
*Assistant Examiner* — Ryan L Heckman
(74) *Attorney, Agent, or Firm* — Lewis Roca Rothgerber Christie LLP

(57) ABSTRACT

The present invention relates to a method for leaching precious metals contained in a waste denitrification catalyst by using a pressure leaching process, and more specifically, to a method for leaching precious metals contained in a waste denitrification catalyst by using a pressure leaching process, the method comprising the steps of: forming a mixture by mixing a waste denitrification catalyst with a sodium salt solution; and leaching vanadium and tungsten contained in the mixture by feeding the mixture into a sealed pressurized reactor, and then heating and stirring the mixture.

4 Claims, 2 Drawing Sheets

(56) References Cited

FOREIGN PATENT DOCUMENTS

| KR | 20030083558 A | * | 10/2003 | |
|----|---------------|---|---------|---|
| KR | 10-2009-0132462 | | 12/2009 | |
| KR | 20090132462 A | * | 12/2009 | |
| KR | 10-2010-0124030 | | 11/2010 | |
| KR | 10-1281579 | * | 7/2013 | ............. C22B 34/22 |

OTHER PUBLICATIONS

Machine Translation of KR-20090132462-A (Year: 2009).*
Machine translation of KR-1020120099496 (Year: 2013).*
Al Abed, S R., J. Purandare, and D Allen. Effect of Liquid to Solid Ratio on Leaching of Metals From Mineral Processing Waste. Presented at 227th American Chemical Society National Meeting, Anaheim, CA, Mar. 28-Apr. 1, 2004 (Year: 2004).*
SIPO Office Action dated Feb. 24, 2018 with English translation of the corresponding Chinese Patent Application No. 201580011877.3, noting listed reference in this IDS (21 pages).
Fang, Zhaoheng, "Leaching," Metallurgical Industry Press, Aug. 2007, ISBN 978-7-5024-4024-4, with partial English translation (19 pages).
International Search Report of corresponding PCT/KR2015//001944, dated Mar. 17, 2015, 4 pp.
EPO Extended Search Report of corresponding European Application No. 15757987.1 dated Sep. 28, 2017 (8 pages).
Luo, Lin et al., "Recovery of tungsten and vanadium from tungsten alloy scrap," 2004, Hydrometallurgy, 72, p. 1-8.
Thompson Scientific, 2017, London, GB, AN 2004-177003, XP-002773574 (2 pages).

* cited by examiner

[FIG. 1]
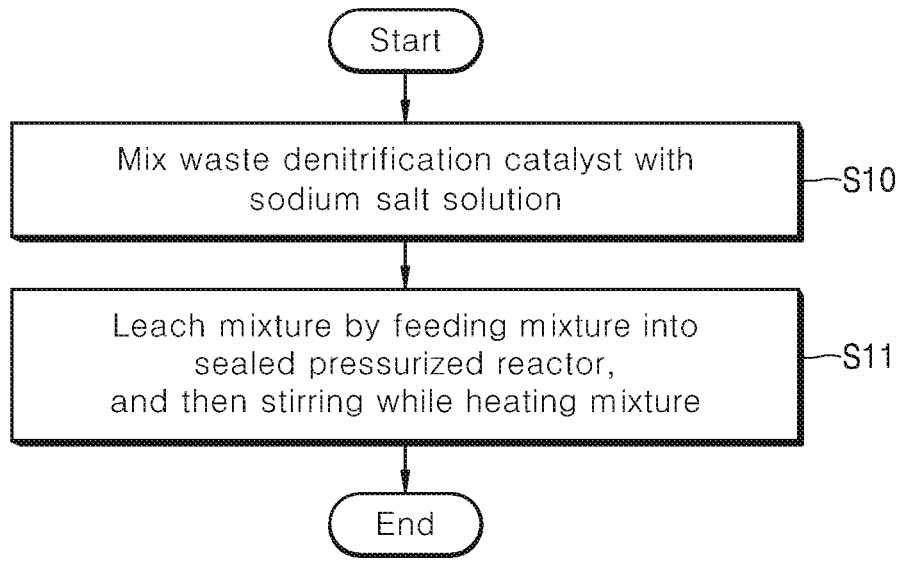
[FIG. 2]
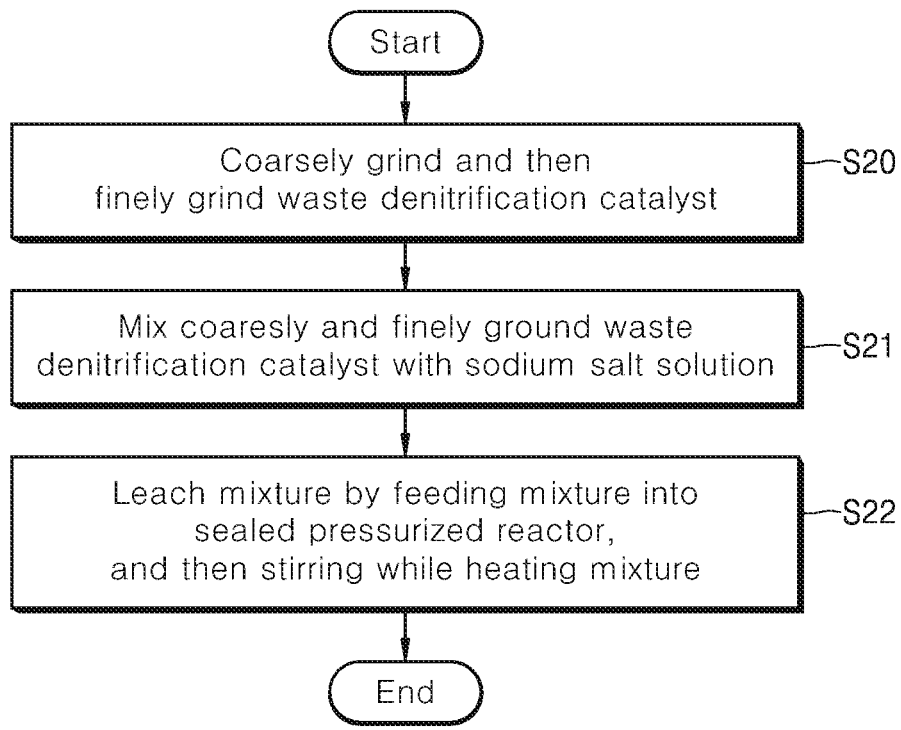

[FIG. 3A]
[FIG. 3B]
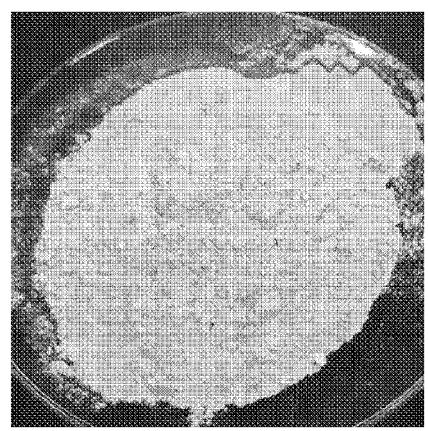

METHOD FOR LEACHING PRECIOUS METALS CONTAINED IN WASTE DENITRIFICATION CATALYST USING PRESSURE LEACHING PROCESS

CROSS-REFERENCE TO RELATED APPLICATION(S)

This application is a National Phase Patent Application and claims priority to and the benefit of International Application Number PCT/KR2015/001944, filed on Feb. 27, 2015, which claims priority to and the benefit of Korean Patent Application Number 10-2014-0026130, filed on Mar. 5, 2014, the entire contents of all of which are incorporated herein by reference.

TECHNICAL FIELD

The present invention relates to a method for leaching precious metals contained in a waste denitrification catalyst by using a pressure leaching process.

BACKGROUND ART

Precious metals occupies an important position as materials in electronic industry as well as jewelry industry due to excellent electric, chemical, physical properties and the demand thereof is increased. In addition, because the chemical property at high temperatures is stable, the precious metals are widely used as aviation materials and petrochemical and automotive catalysts and extensively used in electrical and medical industries and the like, in which corrosion-resistance is required for industrial and commercial uses. However, according to extensive use, the quantity of industrial wastes such as waste electronic equipment scraps, waste petrochemical catalysts, and waste automotive catalysts have been rapidly increased and various precious metals including copper as well as expensive noble metals such as gold, platinum, palladium, and rhodium are contained. Thus, a lot of researches of method for recovering these metals have been conducted.

Meanwhile, in exhaust devices such as a power generation station, a selective catalytic reduction (SCR) that effectively removes nitrogen oxides (NOx) is included, and such a catalyst is generally used for 3 to 4 years and after regeneration of 2 to 3 times, is discarded to become a waste denitrification catalyst. In the waste denitrification catalyst, precious metals such as vanadium (V) and tungsten (W) are contained in oxide forms, and vanadium oxide ($V_2O_5$) is contained with approximately 1 to 3 wt % and tungsten oxide ($WO_3$) is contained with approximately 7 to 10 wt %. Accordingly, when the waste denitrification catalyst is discarded as it is, waste disposal costs are required and an opportunity of ensuring resources through the recovery of the precious metals such as vanadium and tungsten is lost. Thus, techniques for recovering the precious metals contained in the waste denitrification catalyst are required. As the techniques for recovering the precious metals contained in the waste denitrification catalyst, a roasting with soda process, an alkali no-pressure leaching process, and the like are included. However, in the roasting with soda process, there is a problem that excessive energy is used and maintenance of roasting facilities is difficult, and in the alkali no-pressure leaching process, there is a problem in that the leaching rate of the precious metal is low.

As a prior art related with this, there is a method for leaching platinum-group metals from a waste automotive catalyst disclosed in Korea Patent Application Publication No. 10-2010-0124030.

SUMMARY OF INVENTION

Technical Problem

An object of the present invention is to provide a method for leaching precious metals contained in a waste denitrification catalyst by using a pressure leaching process capable of leaching the precious metals from the waste denitrification catalyst at a high leaching rate by a simple method.

The objects of the present invention are not limited to the aforementioned objects, and other objects, which are not mentioned above, will be apparent to a person having ordinary skill in the art from the following description.

Solution to Problem

According to an aspect of the present invention, a method for leaching precious metals contained in a waste denitrification catalyst by using a pressure leaching process, the method includes the steps of: forming a mixture by mixing a waste denitrification catalyst with a sodium salt solution; and leaching vanadium and tungsten contained in the mixture by feeding the mixture into a sealed pressurized reactor, and then heating and stirring the mixture.

Preferably, the waste denitrification catalyst includes vanadium (V), tungsten (W), and the like in oxide forms.

Preferably, the sodium salt may use at least one selected from a group consisting of sodium hydroxide (NaOH), sodium carbonate ($Na_2CO_3$), and sodium chlorate ($NaClO_3$), and the concentration of the sodium salt solution may be 2 to 3 M.

Preferably, the waste denitrification catalyst and the sodium salt solution may be mixed to have a solid-liquid ratio (a weight (g) of the waste denitrification catalyst/a volume (mL) of the sodium salt solution) of 0.1 to 0.4.

Preferably, the heating temperature may be 225° C. to 250° C. and the pressure of the pressurized reactor may be 20 to 80 atm.

Preferably, the vanadium and the tungsten may be leached in forms of $NaVO_3$ and $Na_2WO_4$, respectively.

According to yet another aspect of the present invention, a method for leaching precious metals contained in a waste denitrification catalyst by using a pressure leaching process, the method includes the steps of: coarsely grinding and then finely grinding the waste denitrification catalyst; forming a mixture by mixing the coarsely and finely ground waste denitrification catalyst with a sodium salt solution; and leaching vanadium and tungsten contained in the mixture by feeding the mixture in a sealed pressurized reactor, and then stirring while heating the mixture.

According to yet another aspect of the present invention, a method for leaching precious metals contained in a waste denitrification catalyst by using a pressure leaching process, the method includes the steps of: coarsely grinding and then finely grinding the waste denitrification catalyst; forming a mixture by mixing the coarsely and finely ground waste denitrification catalyst with a sodium salt solution; and leaching vanadium and tungsten contained in the mixture by feeding the mixture in a sealed pressurized reactor, and then stirring while heating the mixture.

Preferably, the size of the coarsely and finely ground waste denitrification catalyst may be 50 to 150 μm.

Advantageous Effect(s) of Invention

As described above, according to the present invention, it is possible to leach vanadium and tungsten contained in the waste denitrification catalyst in forms of $NaVO_3$ and $Na_2WO_4$ by recognizing problems of excessive energy use and difficult maintenance of roasting facilities in a roasting with soda process as one of existing methods for recovering the precious metals from the waste catalyst and a problem of a low leaching rate of precious metals in an alkali no-pressure leaching process, and performing a simple process of mixing the vanadium (V) and the tungsten (W) contained in the waste denitrification catalyst with a sodium salt solution and heating the mixture in a sealed container.

Further, it is possible to leach 90% or more of the precious metals such as vanadium and tungsten by a simple method with low process costs, by using a heating temperature lower than the roasting with soda process in the method for leaching the precious metals contained in the waste denitrification catalyst by using the pressure leaching process.

BRIEF DESCRIPTION OF DRAWING(S)

FIG. 1 is a flowchart illustrating a method for leaching precious metals contained in a waste denitrification catalyst by using a pressure leaching process according to an exemplary embodiment of the present invention.

FIG. 2 is a flowchart illustrating a method for leaching precious metals contained in a waste denitrification catalyst by using a pressure leaching process according to another exemplary embodiment of the present invention.

FIG. 3A is a photograph illustrating a coarsely ground waste denitrification catalyst in the method for leaching the precious metals contained in the waste denitrification catalyst by using the pressure leaching process according to the exemplary embodiment of the present invention.

FIG. 3B is a photograph illustrating a finely ground waste denitrification catalyst in the method for leaching the precious metals contained in the waste denitrification catalyst by using the pressure leaching process according to the exemplary embodiment of the present invention.

DESCRIPTION OF EMBODIMENT(S)

Hereinafter, exemplary embodiments of the present invention will be described in detail with reference to the accompanying drawings.

Various advantages and features of the present invention and methods accomplishing thereof will become apparent from the following description of exemplary embodiments with reference to the accompanying drawings.

However, the present invention is not limited to the following embodiments but may be implemented in various different forms. The embodiments are provided only to complete disclosure of the present invention and to fully provide a person having ordinary skill in the art to which the present invention pertains with the category of the disclosure, and the present invention will be defined by the appended claims.

Further, in the description of the present invention, when it is determined that the gist of the present invention can be blurred by the related known arts, the detailed description thereof will be omitted.

The present invention provides a method for leaching precious metals contained in a waste denitrification catalyst by using a pressure leaching process, the method comprising the steps of: forming a mixture by mixing a waste denitrification catalyst with a sodium salt solution; and leaching vanadium and tungsten contained in the mixture by feeding the mixture into a sealed pressurized reactor, and then stirring while heating the mixture.

The method for leaching the precious metals contained in the waste denitrification catalyst by using the pressure leaching process according to the present invention is an effective method capable of leaching the precious metals with a high leaching rate in a simple process by recognizing the problems shown in the existing leaching methods.

FIG. 1 is a flowchart illustrating a method for leaching precious metals contained in a waste denitrification catalyst by using a pressure leaching process according to an exemplary embodiment of the present invention. Hereinafter, the present invention will be described in detail with reference to FIG. 1.

The method for leaching the precious metals contained in the waste denitrification catalyst by using the pressure leaching process according to the present invention includes forming a mixture by mixing a waste denitrification catalyst with a sodium salt solution (S10).

In this case, the waste denitrification catalyst, as a waste catalyst discharged in thermal power generation facilities, may be in the form of a module and includes vanadium (V) and tungsten (W) in an oxide form (refer to table 1 below).

In the method for the precious metals contained in the waste denitrification catalyst by using the pressure leaching process, the sodium salt may use at least one selected from a group consisting of sodium hydroxide (NaOH), sodium carbonate ($Na_2CO_3$), and sodium chlorate ($NaClO_3$) and the concentration of the sodium salt solution may be 2 to 3 M. When the concentration of the sodium salt solution is less than 2 M, there is a problem in that the leaching rate of the tungsten is very flow, as low as approximately 60%. When the concentration thereof is greater than 3 M, the leaching rates of the vanadium and the tungsten according to an increase in the concentration are not largely increased and thus in terms of process efficiency, the appropriate concentration thereof is 3 M or less.

Further, the waste denitrification catalyst and the sodium salt solution may be mixed to have a solid-liquid ratio (a weight (g) of the waste denitrification catalyst/a volume (mL) of the sodium salt solution) of 0.1 to 0.4. When the solid-liquid ratio is less than 0.1, there is a problem in that the amounts of the vanadium and the tungsten contained in the waste denitrification catalyst are small and thus the leached amounts are also too low. When the solid-liquid ratio is greater than 0.4, the amounts of the vanadium and the tungsten in the solution are large, but the reacted amounts with the sodium salt are chemically limited, and thus in terms of process efficiency, the appropriate solid-liquid ratio is 40% or less.

Next, the method for the precious metals contained in the waste denitrification catalyst by using the pressure leaching process according to the present invention includes leaching the vanadium and the tungsten contained in the mixture by feeding the mixture in a sealed pressurized reactor, and then stirring while heating the mixture (S11).

Preferably, the heating temperature is 225 to 250° C. When the heating temperature is less than 225° C., there is a problem in that the leaching rate of the vanadium is high, but the leaching rate of the tungsten is low. When the heating temperature is greater than 250° C., the leaching rates of the vanadium and the tungsten do not increase anymore, and thus the appropriate heating temperature is 250° C. or less.

In the pressurized reactor sealed by the heating process, pressure of 20 to 80 atm is generated and thus the reaction velocity of the precious metals contained in the waste denitrification catalyst and the sodium salt solution is increased. As a result, the leaching rates of the vanadium and the tungsten which are the precious metals contained in the waste denitrification catalyst are increased.

Further, the stirring may be performed at 700 to 1200 rpm. When the stirring velocity is less than 700 rpm, there is a problem in that the waste denitrification catalyst is deposited on the bottom of the pressurized reactor and the leaching rates of the vanadium and the tungsten are deteriorated. When the stirring velocity is greater than 1200 rpm, the leaching rates of the vanadium and the tungsten do not increase anymore and thus in terms of energy efficiency, the appropriate stirring velocity is 1200 rpm or less.

Due to the heating and stirring process in the sealed pressurized reactor, the vanadium contained in the mixture is leached in the solution in a form of $NaVO_3$ like the following Reaction Formulas 1 and 3 and the tungsten is leached in a form of $Na_2WO_4$ like the following Reaction Formulas 2 and 4. The Reaction Formulas 1 and 2 are cases of using $Na_2CO_3$ as the sodium salt and the Reaction Formulas 3 and 4 are cases of using NaOH as the sodium salt.

$$V_2O_5(s)+Na_2CO_3(s)=2NaVO_3(s)+CO_2(g) \quad \text{[Reaction Formula 1]}$$

$$WO_3(s)+Na_2CO_3(s)=NaWO4(s)+CO_2(g) \quad \text{[Reaction Formula 2]}$$

$$V_2O_5(s)+2NaOH=2NaVO_3(s)+H_2O(g) \quad \text{[Reaction Formula 3]}$$

$$WO_3(s)+2NaOH=Na_2WO_4(s)+H_2O(g) \quad \text{[Reaction Formula 4]}$$

Further, the present invention provides a method for leaching precious metals contained in the waste denitrification catalyst by using a pressure leaching process, the method comprising the steps of: mixing a waste denitrification catalyst containing vanadium (V) and tungsten (W) in oxide forms with at least one sodium salt solution selected from a group consisting of sodium hydroxide (NaOH), sodium carbonate ($Na_2CO_3$), and sodium chlorate ($NaClO_3$); and leaching the vanadium and the tungsten contained in the mixture in forms of $NaVO_3$ and $Na_2WO_4$ respectively, by feeding the mixture in a sealed pressurized reactor, and then heating and stirring the mixture.

FIG. 2 is a flowchart illustrating a method for leaching precious metals contained in a waste denitrification catalyst by using a pressure leaching process according to another exemplary embodiment of the present invention. As illustrated in FIG. 2, the method for leaching the precious metals contained in the waste denitrification catalyst by using the pressure leaching process according to the present invention includes coarsely grinding and then finely grinding the waste denitrification catalyst (S20); forming a mixture by mixing the coarsely and finely ground waste denitrification catalyst with a sodium salt solution (S21); and leaching vanadium and tungsten contained in the mixture by feeding the mixture in a sealed pressurized reactor, and then stirring while heating the mixture (S22). In this case, the waste denitrification catalyst may be coarsely and finely ground to a size of 50 to 150 μm so as to increase reaction efficiency with the sodium salt, enlarge a process scale due to a large volume such as a module, and facilitate a leaching process. When the size of the coarsely and finely ground waste denitrification catalyst is less than 50 μm, there is a problem in that the process costs are increased in order to grind the waste denitrification catalyst to a small size. When the size of the coarsely and finely ground waste denitrification catalyst is greater than 150 μm, there is a problem in that the leaching rates of the vanadium and the tungsten are deteriorated.

FIG. 3A is a photograph illustrating a coarsely ground waste denitrification catalyst in the method for leaching the precious metals contained in the waste denitrification catalyst by using the pressure leaching process according to the exemplary embodiment of the present invention and FIG. 3B is a photograph illustrating a finely ground waste denitrification catalyst in the method for leaching the precious metals contained in the waste denitrification catalyst by using the pressure leaching process according to the exemplary embodiment of the present invention.

Example 1: Leaching 1 of Vanadium and Tungsten Contained Waste Denitrification Catalyst 100 g of a waste denitrification catalyst discharged in Samcheon thermal power plant station was mixed with 1 L of a NaOH solution at a 2.0 M concentration to have a solid-liquid ratio (a weight (g) of the waste denitrification catalyst/a volume (mL) of the sodium salt solution) of 0.1. The mixture of the waste denitrification catalyst and the NaOH solution was fed in a 1 L-grade pressurized reactor and then the pressurized reactor was fully sealed. While the sealed pressurized reactor was heated at 225° C., the mixture was stirred at 1000 rpm and leached for 2 hours. The following Table 1 illustrates components and contents contained in the waste denitrification catalyst.

TABLE 1

| | Component | | | | | | | | |
|---|---|---|---|---|---|---|---|---|---|
| | $Al_2O_3$ | $WO_3$ | $V_2O5$ | $TiO_2$ | CaO | MgO | $SiO_2$ | $MoO_3$ | $Fe_2O_3$ |
| Content (wt %) | 5.57 | 7.73 | 1.23 | 70.9 | 2.45 | 0.55 | 9.80 | 0.10 | 0.77 |

Example 2: Leaching 2 of Vanadium and Tungsten GP-Contained Waste Denitrification Catalyst Except for heating the sealed pressurized reactor at 250° C., the vanadium and the tungsten contained in the waste denitrification catalyst were leached by the same method as Example 1.

Example 3: Leaching 3 of Vanadium and Tungsten Contained Waste Denitrification Catalyst Except for coarsely and finely grinding the waste denitrification catalyst and mixing the waste denitrification catalyst with a size of 100 μm with NaOH, the vanadium and the tungsten contained in the waste denitrification catalyst were leached by the same method as Example 1.

Experimental Example 1: Analysis of Leaching Rate According to Heating Temperature in Leaching In the method for leaching the precious metals contained in the waste denitrification catalyst by using the pressure leaching process according to the present invention, the leaching rates of the vanadium and the tungsten according to changes in heating temperature were analyzed and the result thereof was illustrated in Table 2 below.

In order to analyze the leaching rates according to the heating temperature, an experiment was performed by setting a solid-liquid ratio (a weight (g) of the waste denitrification catalyst/a volume (mL) of the sodium salt solution) of the waste denitrification catalyst and a 2 M NaOH solution to 0.1.

TABLE 2

|  | Temperature (° C.) | | | |
| --- | --- | --- | --- | --- |
|  | 175 | 200 | 225 | 250 |
| V leaching rate (%) | 75.4 | 87.4 | 89.7 | 90.2 |
| W leaching rate (%) | 32.5 | 64.7 | 95.7 | 97.6 |

As illustrated in Table 2, when the heating temperature was 200° C. or less, the leaching rate of the vanadium (V) was slightly high as 87.4%, but the leaching rate of the tungsten (W) was low as 64.7%. Meanwhile, at 225° C. and 250° C., it can be seen that the leaching rate of the vanadium was approximately 90% or greater, and particularly, the leaching rate of the tungsten was rapidly increased as compared with 200° C. Accordingly, in order to increase the leaching rates of the vanadium and the tungsten, it can be seen that the heating temperature is preferably in a range of 225° C. to 250° C.

Experimental Example 2: Analysis of Leaching Rate According to Concentration of Sodium Salt Solution In the method for leaching the precious metals contained in the waste denitrification catalyst by using the pressure leaching process according to the present invention, the leaching rates of the vanadium and the tungsten according to the concentration of the sodium salt solution were analyzed and the result thereof was illustrated in Table 3 below.

In order to analyze the leaching rates according to the concentration of the sodium salt solution, an experiment was performed by setting a heating temperature to 250° C. and a solid-liquid ratio (a weight (g) of the waste denitrification catalyst/a volume (mL) of the sodium salt solution) of the waste denitrification catalyst and a 2 M NaOH solution to 0.2.

TABLE 3

|  | NaOH concentration (M) | | | | |
| --- | --- | --- | --- | --- | --- |
|  | 1.0 | 1.5 | 2.0 | 2.5 | 3.0 |
| V leaching rate (%) | 81.5 | 92.4 | 91.7 | 90.3 | 90.1 |
| W leaching rate (%) | 59.7 | 63.2 | 92.4 | 95.7 | 98.6 |

As illustrated in Table 3, as the NaOH concentration was increased, the leaching rates of the vanadium and the tungsten were increased, and particularly, when the NaOH concentration was 3.0 M, the leaching rates of the vanadium and the tungsten were highest as 90.1% and 98.6%, respectively. Accordingly, as the solid-liquid ratio of the waste denitrification catalyst and the sodium salt solution was increased, the sodium salt solution was further required, and thus it can be seen that the sodium salt solution with a high concentration is required.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description.

Therefore, the sprit of the present invention should not be limited to the above-described embodiments, and the following claims as well as all modified equally or equivalently to the claims are intended to fall within the scope and spirit of the invention.

The invention claimed is:

1. A method for leaching precious metals contained in a waste denitrification catalyst by using a pressure leaching process, the method comprising the steps of:
    forming a mixture by mixing a waste denitrification catalyst with a sodium salt solution; and
    leaching 90% or more of vanadium and tungsten contained in the mixture by feeding the mixture into a sealed pressurized reactor, and then heating and stirring the mixture,
    wherein the waste denitrification catalyst includes vanadium (V) and tungsten (W) in oxide forms,
    wherein the concentration of the sodium salt solution is 2.5 to 3 M,
    wherein the heating temperature is 225° C. to 250° C., and
    wherein the waste denitrification catalyst and the sodium salt solution are mixed to have a solid-liquid ratio (a weight (g) of the waste denitrification catalyst/a volume (mL) of the sodium salt solution) of 0.3 to 0.4,
    wherein the sodium salt solution comprises at least one selected from the group consisting of sodium carbonate ($Na_2CO_3$) and sodium chlorate ($NaClO_3$), wherein the pressure of the pressurized reactor is 20 to 80 atm, and wherein the stirring is performed at 700 to 1200 rpm.

2. The method of claim 1, wherein the vanadium and the tungsten are leached in forms of $NaVO_3$ and $Na_2WO_4$, respectively.

3. A method for leaching precious metals contained in a waste denitrification catalyst by using a pressure leaching process, the method comprising the steps of:
    coarsely grinding and then finely grinding a waste denitrification catalyst;
    forming a mixture by mixing the coarsely and finely ground waste denitrification catalyst with a sodium salt solution; and
    leaching 90% or more of vanadium and tungsten contained in the mixture by feeding the mixture in a sealed pressurized reactor, and then heating and stirring the mixture,
    wherein the waste denitrification catalyst includes vanadium (V) and tungsten (W) in oxide forms,
    wherein the concentration of the sodium salt solution is 2.5 to 3 M,
    wherein the heating temperature is 225° C. to 250° C., and wherein the waste denitrification catalyst and the sodium salt solution are mixed to have a solid-liquid ratio (a weight (g) of the waste denitrification catalyst/a volume (mL) of the sodium salt solution) of 0.3 to 0.4, wherein the sodium salt solution comprises at least one selected from the group consisting of sodium carbonate ($Na_2CO_3$) and sodium chlorate ($NaClO_3$), wherein the pressure of the pressurized reactor is 20 to 80 atm, and wherein the stirring is performed at 700 to 1200 rpm.

4. The method of claim 3, wherein the size of the coarsely and finely ground waste denitrification catalyst is 50 to 150 μm.

\* \* \* \* \*